United States Patent
Young

(10) Patent No.: US 10,517,290 B2
(45) Date of Patent: Dec. 31, 2019

(54) DECOY MOTION ATTACHMENT DEVICE

(71) Applicant: Kevin Rhett Young, Brandon, MS (US)

(72) Inventor: Kevin Rhett Young, Brandon, MS (US)

(*) Notice: Subject to any disclaimer, the term of this patent is extended or adjusted under 35 U.S.C. 154(b) by 136 days.

(21) Appl. No.: 15/133,412

(22) Filed: Apr. 20, 2016

(65) Prior Publication Data

US 2016/0309704 A1 Oct. 27, 2016

Related U.S. Application Data

(60) Provisional application No. 62/151,178, filed on Apr. 22, 2015.

(51) Int. Cl.
*A01M 31/06* (2006.01)

(52) U.S. Cl.
CPC .................. *A01M 31/06* (2013.01)

(58) Field of Classification Search
CPC ...................................... A01M 31/06
USPC ........................................... 43/2, 3
See application file for complete search history.

(56) References Cited

U.S. PATENT DOCUMENTS

| | | | | |
|---|---|---|---|---|
| 2,268,963 A * | 1/1942 | Riddell | .................. | A01M 31/06 43/3 |
| 2,480,390 A * | 8/1949 | Thompson | ............ | A01M 31/06 43/3 |
| 2,849,823 A * | 9/1958 | Miller | .................... | A01M 31/06 43/3 |
| 4,023,297 A | 5/1977 | Jorgensen | | |
| 4,435,913 A | 3/1984 | Messina | | |
| 4,651,458 A | 3/1987 | Lanius | | |
| 4,674,219 A | 6/1987 | Chargo et al. | | |
| 4,691,464 A | 9/1987 | Rudolph | | |
| 5,595,012 A | 1/1997 | Coleman | | |
| 5,775,022 A * | 7/1998 | Sumrall | ................ | A01M 31/06 43/3 |
| 5,809,683 A * | 9/1998 | Solomon | ................ | A01M 31/06 43/3 |
| 6,115,953 A | 9/2000 | Wise | | |
| 6,336,286 B1 | 1/2002 | Liechty, II | | |
| 6,339,893 B1 * | 1/2002 | Solomon | ................ | A01M 31/06 43/3 |
| 6,339,894 B1 * | 1/2002 | Solomon | ................ | A01M 31/06 43/3 |
| 6,412,210 B1 | 7/2002 | Horrell | | |
| 6,487,811 B2 | 12/2002 | Barrett | | |
| 6,574,903 B2 * | 6/2003 | Solomon | ................ | A01M 31/06 43/3 |
| 6,584,721 B1 | 7/2003 | Reule et al. | | |
| 6,760,993 B2 | 7/2004 | Lebens | | |
| 7,117,628 B1 | 10/2006 | Bailey | | |

(Continued)

FOREIGN PATENT DOCUMENTS

CA          2177498          11/1997

*Primary Examiner* — Lisa L Tsang
(74) *Attorney, Agent, or Firm* — Patent Grove LLC; Tomas Friend

(57) ABSTRACT

A motion attachment device designed to be attached to the keel of a decoy includes a housing that is configured to releasably receive the keel. An actuator in the housing is connected to and moves one or more appendages also attached to the housing. The device can be attached to different decoys at different times.

11 Claims, 3 Drawing Sheets

(56) References Cited

U.S. PATENT DOCUMENTS

| | | | |
|---|---|---|---|
| 7,568,305 B2* | 8/2009 | Fanfelle | A01M 31/06 248/156 |
| 8,127,487 B2* | 3/2012 | Gazalski | A01M 31/06 43/3 |
| 8,136,288 B1* | 3/2012 | Shope | A01M 31/06 43/2 |
| 8,266,836 B2* | 9/2012 | Ware | A01M 31/06 43/17.5 |
| 8,584,395 B2 | 11/2013 | Tonkovich | |
| 9,101,129 B2 | 8/2015 | Brooks | |
| 9,609,860 B1* | 4/2017 | Slaughter | A01M 31/06 |
| 10,327,437 B1* | 6/2019 | Allen | A01M 31/004 |
| 2003/0061754 A1* | 4/2003 | Cicoff | A01M 31/06 43/2 |
| 2005/0268522 A1* | 12/2005 | Foster | A01M 31/06 43/3 |
| 2006/0283071 A1* | 12/2006 | Haley | A01M 31/06 43/3 |
| 2007/0289194 A1 | 12/2007 | Alexander | |
| 2011/0023349 A1* | 2/2011 | Hughes | A01M 31/06 43/3 |
| 2011/0088307 A1* | 4/2011 | Rice | A01M 31/06 43/3 |
| 2011/0232154 A1* | 9/2011 | Crank, Jr. | A01M 31/06 43/3 |
| 2012/0198753 A1 | 8/2012 | Idstrom | |
| 2012/0255214 A1* | 10/2012 | Krocheski | A01M 31/06 43/3 |
| 2013/0111800 A1* | 5/2013 | Pifer | A01M 31/06 43/3 |
| 2013/0239454 A1* | 9/2013 | Szechenyi | A01M 31/06 43/3 |
| 2015/0313207 A1* | 11/2015 | Anson | F16M 11/00 43/3 |
| 2018/0192638 A1* | 7/2018 | Denmon | A01M 31/06 |

\* cited by examiner

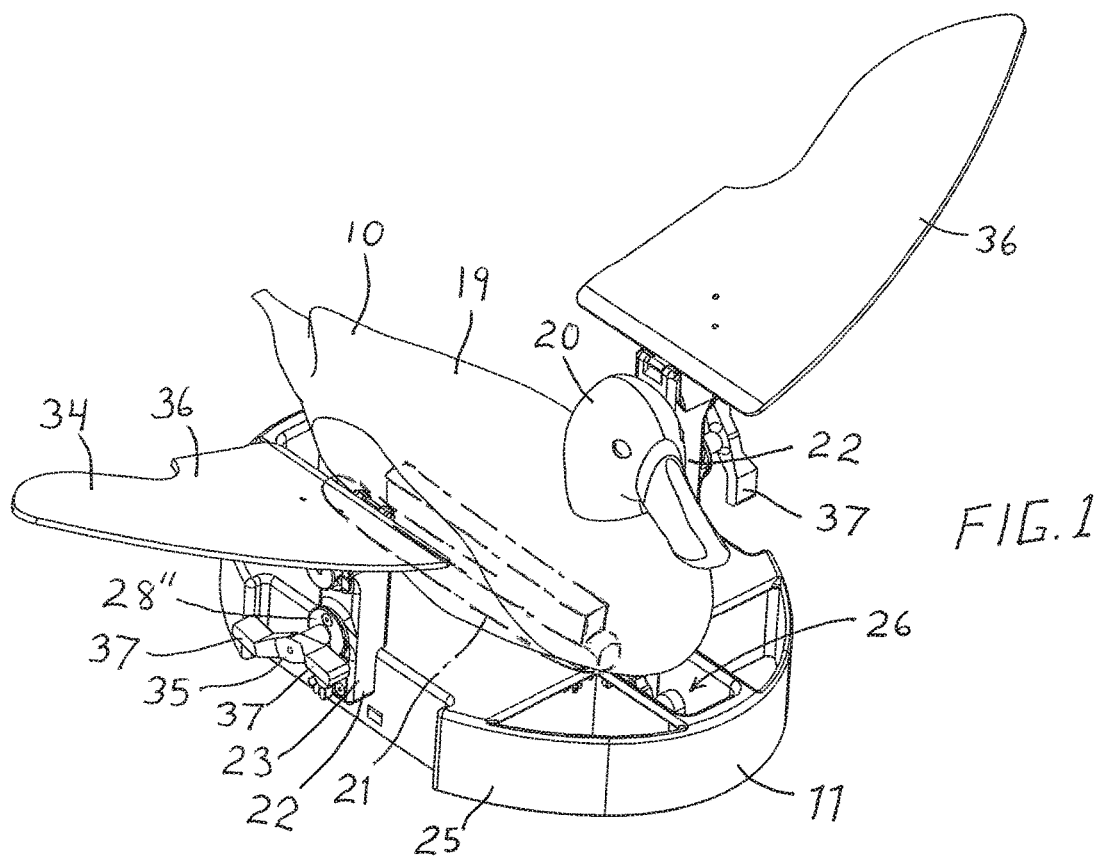
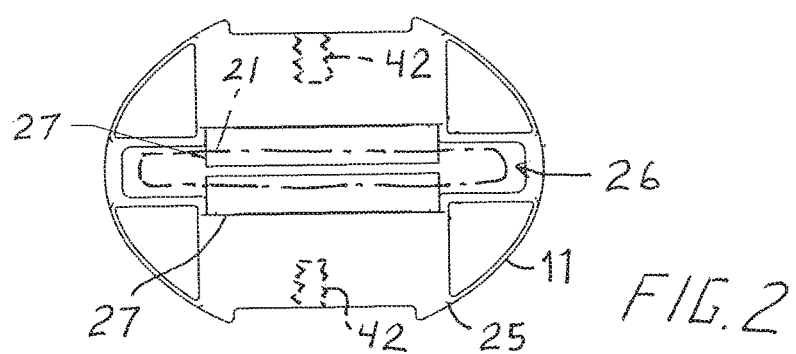

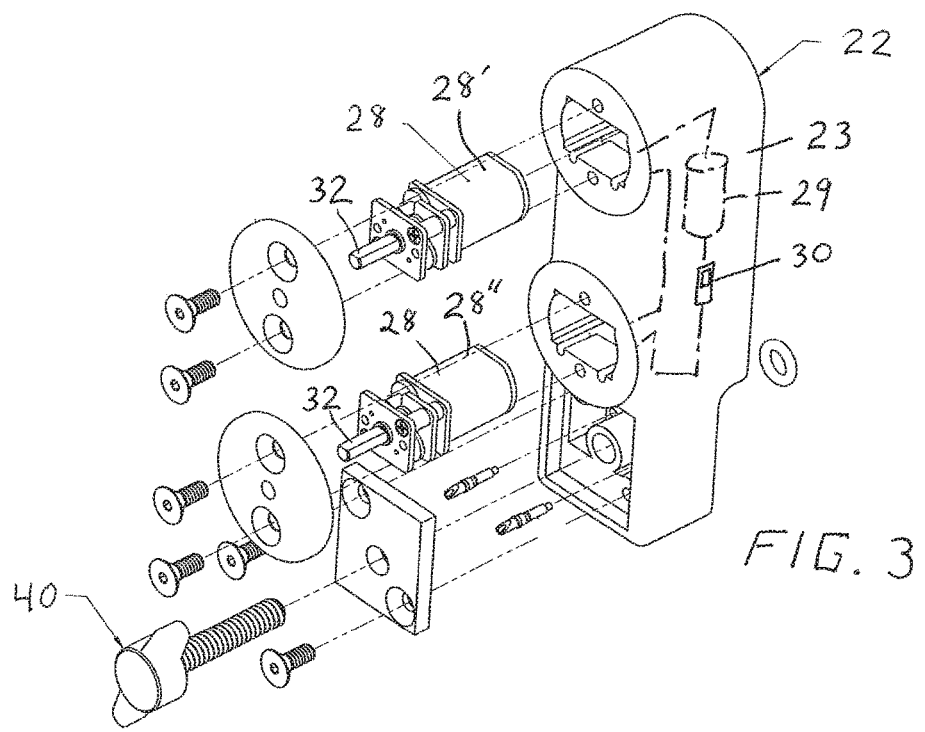
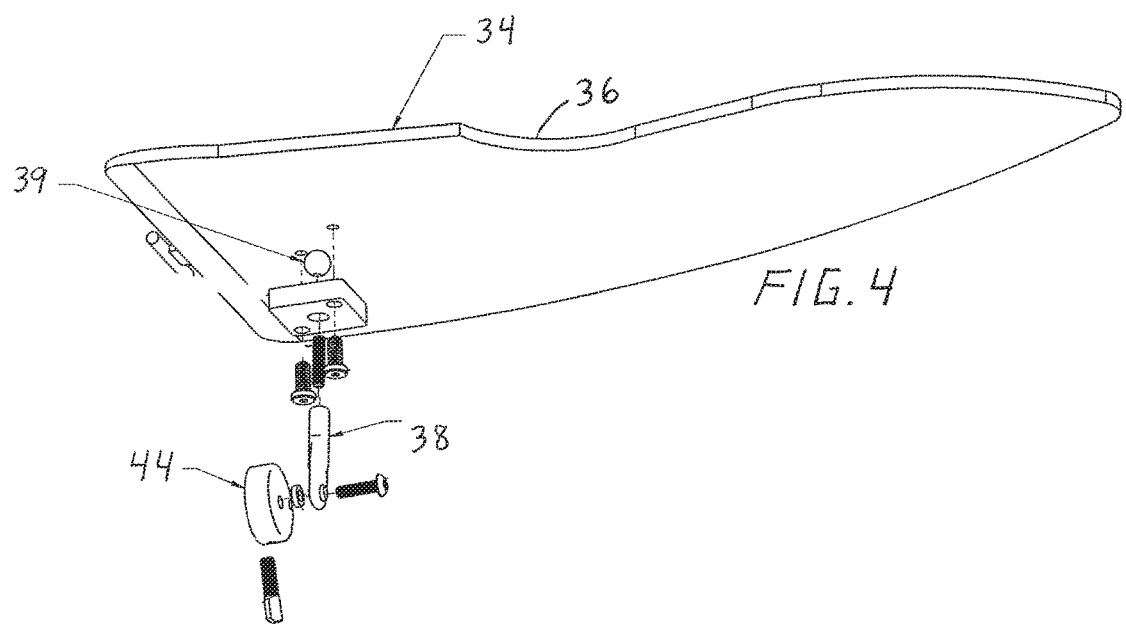

DECOY MOTION ATTACHMENT DEVICE

REFERENCE TO RELATED APPLICATION

Applicant claims the benefit of U.S. Provisional Patent Application Ser. No. 62/151,178 filed Apr. 22, 2015.

TECHNICAL FIELD

This invention relates generally to a animal decoys, and more specifically to a device used in conjunction with an animal decoy to provide a more realistic appearance.

BACKGROUND OF INVENTION

Animal decoys have been used by people for thousands of years. These decoys may be utilized to attract game as well as repel game from a select area. One of the most popular types of animal decoys is the water fowl decoy, which may be in the form of different varieties of ducks or geese.

Water fowl decoys have typically been made of solid wood which is shaped in the form of the fowl and painted to resemble the fowl's markings. More recently water fowl decoys have been made of a hollow unitary plastic form which is colored or painted to resemble the fowl's markings.

One problem with today's decoys is that most are static in that they do not move. As such, the decoy may not properly resemble a flock of water fowl in an accurate manner. Because of this problem, some decoys have been specially designed to include motorized propulsion or motorized wings. These decoys are more costly to purchase and therefore most hunters do not wish to purchase a "flock" of such decoys, especially if they already own several static decoys.

Accordingly, it is seen that a need remains for a decoy device that may easily change a static decoy to a more realistic moving decoy. It is to the provision of such therefore that the present invention is primarily directed.

SUMMARY OF THE INVENTION

A decoy motion attachment device for use with a separate animal decoy comprises a housing removably mounted to the animal decoy, at least one motor coupled to the housing, at least one animal appendage coupled to the at least one motor for motorized movement of the animal appendage, and a battery electrically coupled to the at least one motor. With this construction, the decoy motion attachment device may be mounted and dismounted from the animal decoy and at least one motor provides motion to the at least one animal appendage.

BRIEF DESCRIPTION OF DRAWINGS

FIG. 1 is a perspective view of the decoy motion attachment device shown with a duck decoy.

FIG. 2 is a bottom view of the decoy motion attachment device of FIG. 1.

FIG. 3 is an exploded view of the actuator of the decoy motion attachment device of FIG. 1.

FIG. 4 is an exploded, perspective view of the wing portion of the decoy motion attachment device of FIG. 1.

DETAILED DESCRIPTION

Figure 5:
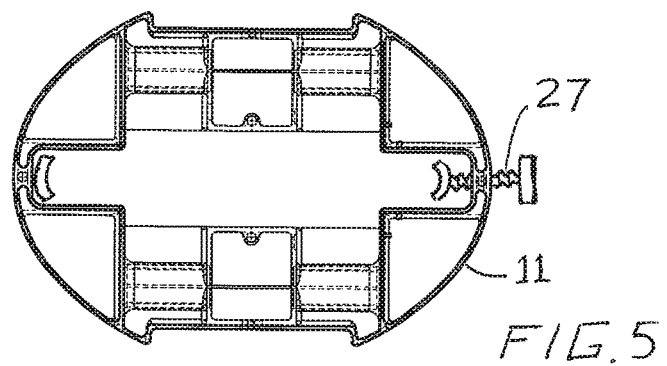
FIG. 5 is a bottom view of the decoy motion attachment device showing the clamping device in an alternative form.

With reference next to the drawings, there is shown an animal decoy 10 and a motion attachment device 11 in a preferred form of the present invention. The animal decoy 10 is shown in the form of a duck, however, it should be understood that other animals may be replicated or depicted.

The decoy 10 includes a body 19 made of a plastic material or the like and is of a hollow construction or of wooden construction. The body 19 includes a head 20 extending from the top portion of the body 19. The decoy 10 also includes an elongated weighted keel 21 extending from the bottom side of the body 19 which maintains the decoy in a generally upright orientation when afloat.

The motion attachment device 11 is designed to be removably coupled to the keel 21 of the decoy and maintain the buoyancy of the decoy. The motion attachment device 11 includes a housing 25 which is preferably made of a plastic material. The housing 25 includes an elongated longitudinal slot 26 which is configured to releasably receive the keel 21 lin order to mount the motion attachment device 11 to the decoy 10. A clamping device 27 is positioned adjacent the slot 26 to clamp down upon and capture the keel and thereby couple the device 11 to the decoy 10. The clamping device 27 may be in the form of elongated member or members which extend parallel to and along one side or opposite sides of the keel, and which clamp down upon the keep, or in the form of a single moveable clamp Which captures one end of the keel and forces the keel against the closed opposite end of the slot 26 which may be include a rubber or resilient material to provide a snug fit, as shown in FIG. 5. Of course, other means of mounting the attachment device to the decoy, and especially the keel, may be utilized such as an adjustable capturing device which fits on opposite ends of the keel, elastic mounting devices, threaded set screw type devices, elastic members, set screws, and the like.

The device 11 also includes a pair of actuators 22 removably mounted to opposite sides of the housing 25. Each actuator 22 includes a watertight casing 23, and at least one motor 28 which is electrically coupled to a battery 29 and on/off switch 30 through electrical wires or connectors 31. Optionally, a multiprocessor may be included to cause a delay, sequencing, power variation, remote control, or reversing of the power from the battery to the motor(s). Also, the wiring 31 may include a charging port adapted to receiving the end of a charger to recharge the battery 29.

The preferred embodiment shown in FIG. 1 includes two motors 28 on each actuator 22, a top motor 28' for driving the movement of the wings and a bottom motor 28" for driving the movement of the feet, as described in more detail hereinafter. However, it should be understood that as an alternative embodiment, the actuator may include only a single motor for driving either the wings or the feet. For clarity, the following description is with regard to the preferred embodiment of FIG. 1.

Each motor 28' and 28" includes or is connected to a rotating shaft, axle, socket or post 32 to which an animal appendage 34 may be coupled. The bottom motor 28" is shown coupled to an appendage 34 in the form of a foot 35 mounted to the motor shaft 32. The foot 35 is in the form of an elongated T-shaped member having two oppositely disposed paddles or ends 37. The actuation of the bottom motor 28" causes the foot 35 to rotate, thereby causing the duck to move through the water while creating a splashing of the water to resemble an actual duck's movement.

The top motor 28' is shown coupled to an appendage 34 in the form of a duck wing 36 hingedly or pivotally mounted to the casing 23 and mechanically coupled to the motor shaft 32. The wing may be mounted to the shaft 32 through linkage extending between the shaft 32 and the wing 36. The linkage includes an elongated rod 38 having a ball joint assembly 39 coupled to the wing to allow rotational and articulated movement of the rod 38 relative to the wing 36. The rod 38 is coupled to the shaft 32 through a flywheel 44 wherein the connection point of the shaft is offset from the axis of the shaft/flywheel to cause the rod to move vertically through rotational movement of the shaft 32 and thereby the flywheel 44.

The actuation of the top motor 28' causes the wing 36 to move up and down, thereby causing the duck to have the appearance of preening, drying of wings, or flight. With either appendage, the motor(s) may be actuated to rotate in one direction or rotate back and forth in opposite directions. The electric circuit including the motors and battery may also include motion and sound sensors to initiate the actuation of the motors. A remote control device (by radio control, bluetooth, or other wireless protocol) may also be included to allow actuation of the motor, independent actuation of each motor, to allow steering and controlled movement of the decoy. Alternatively, the duck decoy or device may include a tether which anchors the combination to the bottom to allow limited range, the tether may be adjustable in length.

Each actuator 22 is self contained and is removably mounted to the housing 25 through a hand driven threaded bolt 40 extending through a bolt hole 41 in the casing 23. The bolt 40 is threaded into a corresponding internally threaded bolt hole 42 in the housing 25.

In use, the motion attachment device 11 is mounted to a decoy 10 by extending the decoy's keel 21 through the slot 26 of the device and actuating the clamping device 27 to secure the device 11 to the decoy 10. With the device 11 secured in place the combination decoy and device may be place on land or in the water to resemble a real animal which the decoy is imitating.

The on/off switch 30 is then actuated to that the battery 29 energizes the motor(s), which in turn actuates the appendage 34 coupled to the motor(s). The motion attachment device 11 may be operated to cause the decoy 10 to move forward, backwards, spin, rotate, flutter the wings, splash the water, move the feet, bob the head, or raise the wings. The operation of the bottom motor 28' causes the foot 35 to rotate resulting in the paddled movement of the decoy. Similarly, the operation of the top motor 28" causes the linkage rod 38 to reciprocate resulting in the "flapping" or movement of the wings 36. The decoy may be coupled to legs or a stand so that it may be utilized on land with the motors actuating the wings.

If one wished, the actuators 22 could be removed or switch with other actuators 22 to provide for easy replacement of the actuator or to provide a different appendage characteristic associated with an actuator in a quick and easy fashion, i.e., a different arrangement of motors and/or appendages. To accomplish this, the threaded bolt 40 is simply unscrewed from the bolt hole 41 to release the actuator casing 23 from the housing 25.

The advantage of the present device is its ability to add the device 11 to a pre-existing decoy 10 to enable a variety of new motions to depict a more realistic appearance to the decoy. As such, the device 11 may be added to different decoys 10 at different times, thereby enabling the hunter to avoid having to purchase many different decoys to attract different species at different times of the year or locations. For example, the device 11 may be utilized with a mallard duck. decoy at one time and with a different pintail duck, goose, or other type or species of water fowl decoy at a different time.

Another advantage of the present invention is the ability to interchange, replace or switch different actuators in a quick and easy fashion. For example, if one were to wish to switch from a wing flapping actuator to a foot swimming actuation this can easily be accomplished by unthreading the actuator bolt 40 from the bolt hole 42 thereby removing the actuator from the housing 25 and replacing it with a different actuator.

The decoy itself may also include a motorized mechanism which when actuated expands the size or volume of the chest area or uses an attached appendage in the form of a chest so as to simulate the "puffing" or "showing" of an animal, such as the bellowing of a turkey. This may be accomplished with a motor which pushes outwardly upon plates that form the decoy chest.

A water pump or jet pump may also be included for additional motion, spray feature, or propulsion of the decoy. Also, a propeller or fan may be included to providing hovering capabilities.

It thus is seen that a decoy is now provided which overcomes problems associated with decoys of the prior art. While this invention has been described in detail with particular references to the preferred embodiments thereof, it should be understood that many modifications, additions and deletions, in addition to those expressly recited, may he made thereto without departure from the spirit and scope of the invention.

The invention claimed is:

1. A motion attachment device for use with a static water fowl decoy, said device comprising:
    a housing comprising a slot configured to receive a keel of the static decoy;
    a reversible clamping device that reversibly holds the keel of the static decoy within the slot in the housing;
    a first watertight casing removably attached to a first side of the housing, said first watertight casing containing a first electric motor, a first actuator, and a battery;
    a second watertight casing removably attached to a second side of the housing opposite said first side, said second watertight casing containing a second electric motor, a second actuator, and a battery;
    a first appendage reversibly attached to the housing or the first watertight casing at the first side of the housing such that, in use, a movement of the first appendage is actuated by the first actuator;
    a second appendage reversibly attached to the housing or the second watertight casing at the second side of the housing such that, in use, a movement of the second appendage is actuated by the second actuator.

2. A system for controlling the device of claim 1, said system comprising the device of claim 1, and a remote control device controlling actuation of the first motor and the second motor.

3. The device of claim 1, further comprising:
    an electric circuit including the first motor and at least one of a motion sensor and a sound sensor that initiates activation of the first motor, and
    an electric circuit including the second motor and at least one of a motion sensor and a sound sensor that initiates activation of the second motor.

4. The device of claim 1, wherein the first watertight casing and the second watertight casing are each independently removably mounted to the housing by a hand driven threaded bolt extending through a bolt hole in the watertight casing and threaded into a corresponding internally threaded bolt hole in the housing.

5. The device of claim 1, wherein:
the first appendage is an artificial wing that flaps when movement is actuated or an artificial foot that propels the housing when movement is actuated, and
the second appendage is an artificial wing that flaps when movement is actuated or an artificial foot that propels the housing when movement is actuated.

6. The device of claim 1, wherein:
said first watertight casing further contains a multiprocessor coupled to the first motor to cause one or more of a delay, sequencing, power variation, remote control, and reversing of power from the battery to the first motor, and
said second watertight casing further contains a multiprocessor coupled to the second motor to cause one or more of a delay, sequencing, power variation, remote control, and reversing of power from the battery to the second motor.

7. The device of claim 1, wherein the first appendage is a wing coupled to the first motor through a linkage comprising a rod with a ball point coupled to the wing, and the second appendage is a wing coupled to the second motor through a linkage comprising a rod with a ball point coupled to the wing.

8. A motion attachment device for use with a static water fowl decoy, said device comprising:
a housing comprising a slot configured to receive a keel of the static decoy;
a reversible clamping device that reversibly holds the keel of the static decoy within the slot in the housing;
a first watertight casing removably attached to a first side of the housing, said first watertight casing containing a top electric motor, a bottom electric motor, a top actuator coupled to the top electric motor, a bottom actuator coupled to the bottom electric motor, and a battery connected to the top electric motor and the bottom electric motor;
a second watertight casing removably attached to a second side of the housing opposite said first side, said second watertight casing containing a top electric motor, a bottom electric motor, a top actuator coupled to the top electric motor, a bottom actuator coupled to the bottom electric motor, and a battery connected to the top electric motor and the bottom electric motor;
a first top appendage reversibly attached to the housing or the first watertight casing at the first side of the housing such that, in use, a movement of the first top appendage is actuated by the top electric motor contained in the first watertight casing;
a second top appendage reversibly attached to the housing or the second watertight casing at the second side of the housing, opposite said first side, such that, in use, a movement of the second top appendage is actuated by the top electric motor contained in the second watertight casing;
a first bottom appendage reversibly attached to the housing or the first watertight casing at the first side of the housing such that, in use, a movement of the first bottom appendage is actuated by the bottom electric motor contained in the first watertight casing;
a second bottom appendage reversibly attached to the housing or the second watertight casing at the second side of the housing, opposite said first side, such that, in use, a movement of the second bottom appendage is actuated by the bottom electric motor contained in the second watertight casing;
wherein:
the first top appendage is an artificial wing that flaps when movement is actuated;
the second top appendage is an artificial wing that flaps when movement is actuated;
the first bottom appendage is an artificial foot that propels the housing when movement is actuated; and
the second bottom appendage is an artificial foot that propels the housing when movement is actuated.

9. The device of claim 8, wherein the first watertight casing and the second watertight casing are each independently removably mounted to the housing by a hand driven threaded bolt extending through a bolt hole in the watertight casing and threaded into a corresponding internally threaded bolt hole in the housing.

10. The device of claim 8, wherein:
the first appendage is an artificial wing that flaps when movement is actuated or an artificial foot that propels the housing when movement is actuated, and
the second appendage is an artificial wing that flaps when movement is actuated or an artificial foot that propels the housing when movement is actuated.

11. The device of claim 8, wherein:
said first watertight casing further contains a multiprocessor coupled to the first motor to cause one or more of a delay, sequencing, power variation, remote control, and reversing of power from the battery to the first motor, and
said second watertight casing further contains a multiprocessor coupled to the second motor to cause one or more of a delay, sequencing, power variation, remote control, and reversing of power from the battery to the second motor.

* * * * *